United States Patent [19]

Gonzalez

[11] 4,377,892
[45] Mar. 29, 1983

[54] METHOD OF FABRICATING SINTERED METAL/POLYMER IMPREGNATED BALL VALVE SEATS

[75] Inventor: Ricardo Gonzalez, Holden, Mass.

[73] Assignee: Worcester Controls Corp., West Boylston, Mass.

[21] Appl. No.: 214,904

[22] Filed: Dec. 10, 1980

[51] Int. Cl.³ .......................... B23P 15/00; B22F 1/02
[52] U.S. Cl. ..................... 29/157.1 R; 29/149.5 PM; 251/359; 251/368; 277/DIG. 6; 419/10; 419/29
[58] Field of Search ................ 29/157.1 R, 149.5 PM, 29/420.5, 420; 251/359, 368; 277/233, 235 A, DIG. 6

[56] References Cited

U.S. PATENT DOCUMENTS

| | | | |
|---|---|---|---|
| 2,719,095 | 9/1955 | Scanlan | 29/420.5 |
| 2,788,324 | 4/1957 | Mitchell | 29/149.5 PM |
| 2,798,005 | 7/1957 | Love | 29/149.5 PM |
| 2,838,829 | 6/1958 | Goss et al. | 29/149.5 PM |
| 2,951,721 | 9/1960 | Asp | 277/233 |
| 3,592,440 | 7/1971 | McFarland et al. | 29/157.1 R |
| 3,597,820 | 8/1971 | Schenck, Jr. | 29/157.1 R |
| 3,765,958 | 10/1973 | Freche et al. | 29/420.5 |
| 3,818,564 | 6/1974 | Tsuya et al. | 29/149.5 PM |
| 3,917,149 | 11/1975 | Breton et al. | 29/420.5 |
| 4,026,657 | 5/1977 | Chmura | 29/149.5 PM |

*Primary Examiner*—Daniel C. Crane
*Attorney, Agent, or Firm*—Pollock, Vande Sande & Priddy

[57] ABSTRACT

A sintered metal body, having an annular form suitable for use as a valve seat or seal, is impregnated with an uncured polymeric material such as PTFE which is then cured to partially fill the interparticulate spaces in the sintered metal body. The impregnated body is then subjected to applied pressure which preserves the annular shape of the body while collapsing substantially all voids throughout the body to cause the cured polymeric material within the sintered metal body to completely fill the collapsed interparticulate spaces thereby to render the body nonporous throughout. Inasmuch as the interparticulate spaces are completely filled with cured polymeric material, any increases in temperature of the body which result in an expansion of the polymeric material cause a migration of portions of that material from the interior of the body to the exterior surfaces of the body to lubricate the exterior surfaces. The body may, in addition, be completely covered by another layer of cured polymeric material to give the seat additional initial lubricity.

2 Claims, 2 Drawing Figures

METHOD OF FABRICATING SINTERED METAL/POLYMER IMPREGNATED BALL VALVE SEATS

BACKGROUND OF THE INVENTION

The present invention relates to sintered metal bodies, particularly bodies of annular configuration suitable for use as the seat of a ball valve, whose pores or interparticulate spaces are impregnated with a polymeric material such as PTFE or TFE (Teflon).

It is desirable to use metal seats in a ball valve under certain circumstances since the resultant valve configuration can resist higher pressures than valves which use other types of seat materials, e.g., PTFE seats. When a metal seat is disposed adjacent a ball, however, there is considerable friction between the two which could cause galling problems, and therefore, in an effort to reduce these friction problems somewhat, it is typical for metal seats to be used in conjunction with trunnioned ball valves so that the pressure between the ball and seat can be carefully controlled due to the fact that the ball is mounted for rotation on its own trunnion. This, however, is a comparatively expensive construction. Metal seats are hardly ever used in floating ball arrangements due to the high torques which would result, the galling problems, etc.

McFarland et al U.S. Pat. No. 3,592,440, the disclosure of which is incorporated herein by reference inasmuch as the patent discloses manufacturing techniques and materials suitable for use in the improvement of the present invention, seeks to avoid some of these problems, and to provide a metal seat capable of use in a floating type ball valve, by providing a sintered metal seat whose exterior surfaces are coated with a layer of cured polymeric material, e.g., PTFE, and whose interior pores or interstices are partially filled with cured polymeric material. The seat of the McFarland et al patent is, however, a porous structure which relies upon a continuous surface coating of polymeric material to achieve a desired seal, or upon a caulking action of the polymer increments within the seat to effect a desired seal in the event that the surface polymer coating should be destroyed by fire or abrasion. This known seat, being essentially porous throughout, will therefore tend to leak fluid through the seat when the seat is subjected to pressure if the integrity of the surface coating should be impaired and the aforementioned caulking effect is imperfect.

SUMMARY OF THE INVENTION

The present invention obviates the foregoing disadvantages of the McFarland et al structure by providing a ball valve seat consisting of a sintered metal matrix whose interparticulate spaces are completely filled with cured polymeric material, whereby the seat structure, in addition to being of metal construction and therefore adapted for use in those applications where metal seats are desirable, is nonporous throughout without regard to the presence or absence of a surface coating of polymeric material. While such a surface coating can be provided to achieve additional initial lubricity, the provision of such a surface coating is optional only inasmuch as incremental portions of the cured polymeric material which fill the interstices of the sintered metal matrix adjacent the surface of the seat provide desired lubricity. Any increase in temperature of the seat with a resultant expansion of the polymeric material within the seat, causes an extrusion or migration of said polymeric material from the interior of the seat through the surface of the seat to provide additional lubricity, i.e., since no voids are present within the seat itself, upon expansion of the polymeric material within the seat and resultant increase in the internal pressure of the seat, the expanded interior polymeric material has no place to go except to migrate through the matrix of sintered material toward the exterior surface of the seat and to extrude from the matrix adjacent the seat surface thereby to increase the lubricity of the seat at the seat/ball interface of the valve.

The seat of the present invention can be prepared by a series of steps, and by using metal and polymeric materials, in accordance with the disclosure of the aforementioned McFarland et al patent. A sintered metal "green compact" structure is initially fabricated in the form and shape conventionally employed with ball valve seats, whereafter the green compact is sintered to fuse adjacent metal particles to each other, whereafter the resultant seat is impregnated with an emulsion of uncured polymeric material having lubricity, the impregnation being effected by means of a vacuum and/or positive pressure step. The liquid vehicle employed in the emulsion is then dried whereafter the residual polymeric material is cured by heating.

In the McFarland et al process, a seat prepared by a series of steps such as is described above is considered to be completely fabricated except for a final surface finishing step, e.g., grinding, to provide the seat with a desired surface accuracy, and the final seat is porous throughout except for a layer of polymeric material which covers the exterior surfaces of the seat. In contrast, in accordance with the present invention, following the aforementioned curing step the seat is placed in a die and subjected to extremely high pressures which operate to collapse substantially all of the interparticulate cavities and voids throughout the seat onto the portions of the cured polymeric material within the sintered metal matrix whereby, following completion of this pressure applying step, the cured polymeric material within the sintered metal seat completely fills all of the collapsed interparticulate spaces within the seat and the seat is rendered nonporous throughout. The seat can then be surface finished, if necessary, or the seat can optionally be coated with a further layer of polymeric material which is thereafter surface finished if necessary.

Sintered metal elements have been suggested in the art heretofore, e.g, see Chmura U.S. Pat. No. 4,118,009, Iwata et al U.S. Pat. No. 3,856,478, Earley U.S. Pat. No. 3,751,005, Sandenburgh U.S. Pat. No. 3,643,916, and Harris et al U.S. Pat. No. 3,445,148, and in some cases the sintered metal elements are associated with a lubricant or polymeric material, e.g., see Tsuya et al U.S. Pat. No. 3,818,564, Niimi et al U.S. Pat. No. 3,790,352, Ryshavy U.S. Pat. No. 2,893,793 and Mitchell U.S. Pat. No. 2,788,324, in addition to the previously discussed McFarland et al patent. In some cases, moreover, prior workers in the field have contemplated the use of a "coining" or compression of the sintered metal element, e.g., see the aforementioned Chmura and Harris et al patents, but these prior compression techniques have typically been so applied that the resultant structure exhibits a high density or nonporous portion adjacent its surface only, and a lower density porous structure underlying the surface. In contrast, the pressure applying step of the present invention is such that the final seat exhibits substantially uniform density throughout and is nonporous throughout.

BRIEF DESCRIPTION OF THE DRAWINGS

The foregoing objects, advantages, construction and operation of the present invention will become more readily apparent from the following description and accompanying drawings wherein.

DESCRIPTION OF THE PREFERRED EMBODIMENTS

Figure 1:
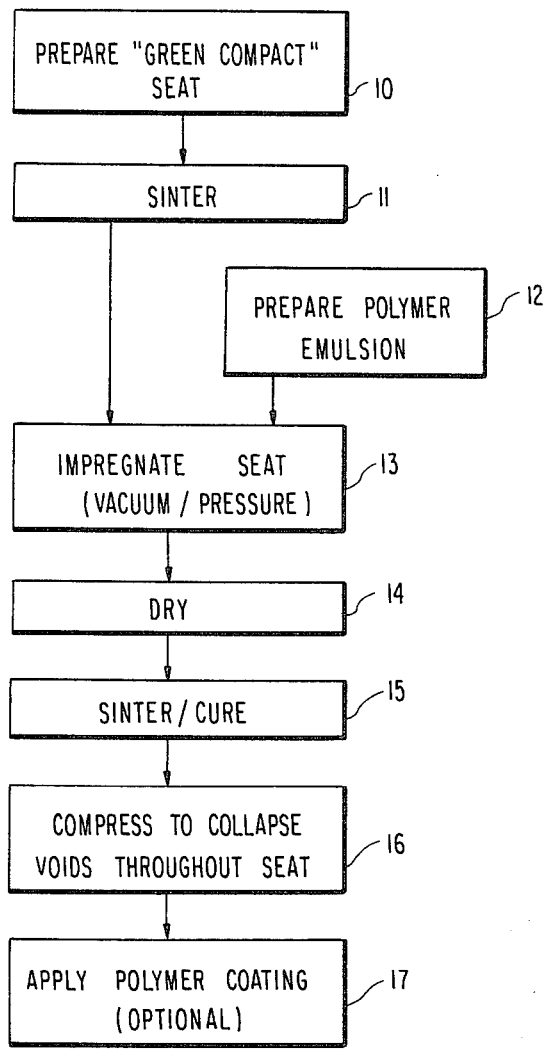
FIG. 1 diagrammatically illustrates a plurality of steps which constitute a method of fabrication in accordance with the present invention.

Referring to FIG. 1, in a first step 10 of the method of the present invention a quantity of powdered metal (e.g. stainless steel or bronze) is placed in a die whose interior configuration corresponds to the configuration desired of the final structure (e.g., an annular configuration when the object being prepared is a seat for use in a ball valve), and the powdered metal is subjected to pressures in the order of 30 tons per square inch to form a unitary metal body having the desired configuration. At this point in the fabrication operation, the individual metal particles are held together simply by inter-particle friction, and the structure is termed a "green compact" in the parlance of the trade. In a second step 11, the green compact is then placed in a furnace and subjected to a high temperature which is less than the melting point of the metal material in the seat but which is sufficiently high to cause a coalescing of the interfaces between the various particles in the green compact to unify the structure into a sintered metal matrix. The resultant structure is porous.

In a step 12, which may be performed before, concurrently, or after steps 10 and 11, a PTFE emulsion is formed by mixing a quantity of submicron PTFE particles in an appropriate vehicle such as water, along with some wetting agents; it must be understood, however, as discussed in the aforementioned McFarland et al patent, that other uncured polymer materials can be employed and entrained or suspended in other liquid vehicles. The emulsion produced in step 12, and the sintered metal seat produced by step 11 are then, in a step 13, placed in a vacuum chamber, initially in spaced relation to one another, and a vacuum is drawn in the chamber to remove all air from the voids or pores in the sintered metal seat. The sintered metal seat is then immersed in the emulsion, and the vacuum is broken (if desired, a positive pressure may also be introduced into the chamber) to drive the emulsion into the pores of the sintered metal seat. The resultant polymer impregnated seat is then removed from the chamber and permitted to dry, in a step 14, e.g., at a temperature which is below the boiling point of water or which is otherwise suitable to remove the water or other liquid vehicle constituents from the emulsion, leaving a residue of PTFE (and/or of whatever other polymer is employed) in the pores of the sintered metal seat.

When the liquid vehicle is removed by the aforementioned drying step, voids are created within the seat and the interparticulate spaces of the sintered metal matrix are no longer completely filled with polymer, i.e., the structure at this point is still somewhat porous. Following the drying step, the impregnated seat is again placed in a furnace in a step 15, and is heated to sinter and cure the PTFE at an appropriate "Teflon-sintering" temperature, i.e., one which is considerably lower than the sintering temperature previously employed for the metal seat alone. By way of example, if the green compact prepared in step 10 constitutes stainless steel particles, it would be sintered at approximately 2500° F., whereas Teflon is sintered (in step 15) at around 700° F. Sintering step 15 is needed to coalesce the Teflon particles, previously in the emulsion, with one another since, otherwise, the Teflon particles would be driven out of the pores in the sintered metal seat when the seat is later subjected to fluid pressure. However during this second sintering step 15, the coalescing action of the Teflon particles tends to cause some shrinkage of the PTFE in the pores of the sintered metal seat, and this, together with the voids which were created when the water or other liquid vehicle was removed or driven off in step 14, makes this structure even more porous following completion of step 15 than it was prior to the commencement of that step.

Figure 2:
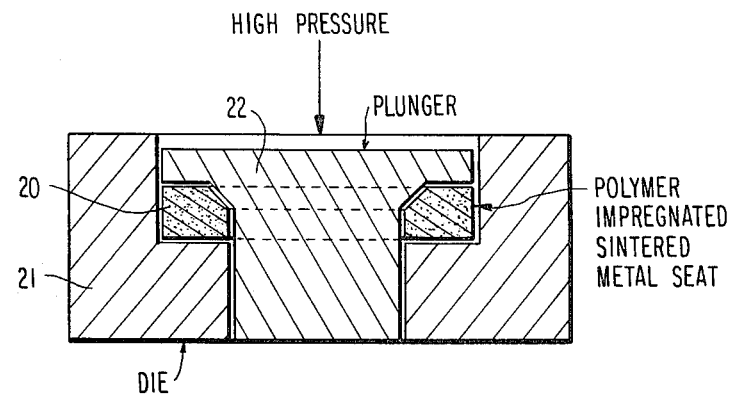
FIG. 2 is a cross-sectional view of a seat fabricated in accordance with the present invention and an associated die utilized in the compression step of FIG. 1.

In order to render the overall structure nonporous, the structure is then subjected, in a step 16, to extremely high pressures which collapse substantially all of the interparticulate cavities and voids throughout the seat onto the enclosed PTFE or other cured polymer within the seat, to eliminate all interparticulate voids in the sintered metal seat to the extent possible, and to render the complete seat impervious to fluid flow, i.e., to make the final product "leak free" throughout. Step 16 can be effected in the manner shown in FIG. 2 wherein the annular, polymer impregnated, sintered metal seat 20, produced by method steps 10–15 described above, is placed in a die 21 which has a cooperating plunger 22 that, together, define exterior surfaces which closely conform to all of the exterior surfaces of seat 20, whereafter extremely high pressures, in the order of 40 tons per square inch, are applied to the seat to collapse all voids within the seat material and to render it nonporous and of substantially uniform density throughout.

The seat 20, following completion of step 16, is of sintered metal construction wherein cured PTFE (or whatever other polymer having desired lubricity is employed) fills the interparticulate spaces or collapsed voids of the sintered metal matrix throughout the body of the seat. The seat is, accordingly, nonporous throughout. Indeed, seats constructed in accordance with the present invention have been found to hold bubble tight on helium, which is a most stringent leakage test. Those incremental portions of the polymer material which are adjacent the surface of the seat act as a lubricant at said surface. Moreover, since all interparticulate voids have been collapsed by step 16, when the seat is used in an application where the temperature is higher than room temperature, the cured polymer within the seat expands but has no place to go; and the resultant expansion is therefore manifested as an increase in the internal pressure of the seat, through the matrix of sintered metal material, which produces a migration of the cured polymer toward the surface of the seat and causes some extrusion of the polymer from the seat surface to increase the lubricity of the seat at the seat/ball interface.

Following step 16, the seat may, in a step 17, be dipped in a PTFE emulsion which is much more viscous in consistency than the emulsion employed in steps 12 and 13, to coat the seat with a layer of Teflon or other polymer having desired lubricity, whereafter the coating layer is again sintered and cured to provide the seat with an outer envelope which gives the seat additional initial lubricity. As indicated in FIG. 1, however, this final step is optional. Moreover, if desired, the outer polymer layer, if provided, may be characteristically colored to clearly identify the type of seat which has been produced.

While I have thus described a preferred embodiment of the present invention, many variations will be apparent to those skilled in the art. For example, the method of the present invention can be used to fabricate valve seats or seals of other kinds, such as stem seals for a variety of valve types, or seats for use in gate valves. It must therefore be understood that the foregoing description is intended to be illustrative only and not limitative of the present invention and all such variations and modifications as are in accord with the principles described are meant to fall within the scope of the appended claims.

Having thus described my invention, I claim:

1. The method of fabricating a leak-proof seat for use in a ball valve comprising the steps of compacting a mass of metal particles, said mass being of annular form and having a ring-shaped face adapted to be disposed adjacent to a rotary ball in a ball valve, sintering said annular mass to fuse adjacent ones of said metal particles to one another thereby to coalesce said particles into a porous metal matrix of annular form, impregnating said annular metal matrix with an emulsion consisting of uncured particles of a polymer material carried by a liquid vehicle, said impregnating step being conducted under positive pressure conditions to drive the emulsion into the interparticulate spaces in said metal matrix and to completely fill said interparticulate spaces throughout said annular metal matrix with said emulsion, drying said emulsion-impregnated annular metal matrix to remove said liquid vehicle therefrom thereby to leave a residue of uncured polymer particles in said interparticulate spaces, thereafter heating said annular metal matrix to sinter and cure the polymer particles which are residual in said interparticulate spaces, then placing said metal matrix in a die having an annular cavity whose interior shape closely conforms to the exterior annular shape of said cured polymer-impregnated annular metal matrix, and thereafter, by use of said die, applying pressure to the exterior surfaces of said annular metal matrix in a magnitude sufficiently high to collapse the interior of said matrix onto the cured polymer within said matrix thereby to eliminate all voids throughout the interior of said annular matrix, remaining in said matrix following said drying and sinter/curing steps, so as to render said annular matrix nonporous throughout, said pressure applying step being so conducted as to produce an annular body whose shape and dimensions are adapted for use as a ball seat in a rotary ball valve, said annular body having substantially uniform density throughout the interior of said body and at the exterior surfaces of said body upon completion of said pressure applying step and, including the further steps, conducted after said pressure applying step, of coating the exterior surfaces of said annular body with a further emulsion of polymer particles, said further emulsion being more viscous than the emulsion employed in said impregnating step, and thereafter drying said coating and sintering and curing the polymer particles in said coating to enclose said annular body in an outer envelope of polymer material.

2. The method of claim 1 wherein said polymer material is PTFE.

* * * * *